(12) United States Patent
Rivers et al.

(10) Patent No.: US 6,620,330 B2
(45) Date of Patent: Sep. 16, 2003

(54) DETOXIFICATION OF QUATERNARY ONIUM COMPOUNDS WITH POLYCARBOXYLATE-CONTAINING COMPOUND

(75) Inventors: Gordon T. Rivers, Houston, TX (US); Lynn M. Frostman, Sugar Land, TX (US); John L. Pryzbyliski, Missouri City, TX (US); Jo Ann McMahon, Arnold, MO (US)

(73) Assignee: Baker Hughes Incorporated, Houston, TX (US)

( * ) Notice: Subject to any disclaimer, the term of this patent is extended or adjusted under 35 U.S.C. 154(b) by 77 days.

(21) Appl. No.: 10/028,802

(22) Filed: Dec. 18, 2001

(65) Prior Publication Data

US 2003/0146173 A1 Aug. 7, 2003

(51) Int. Cl.$^7$ .................................................. C02F 1/00
(52) U.S. Cl. ........................................................ 210/749
(58) Field of Search .......................................... 210/749

(56) References Cited

U.S. PATENT DOCUMENTS

| | | |
|---|---|---|
| 4,204,954 A | 5/1980 | Jacob |
| 5,169,536 A | 12/1992 | Vasconcellos et al. |
| 5,486,296 A | 1/1996 | Petrille, III et al. |
| 5,518,636 A * | 5/1996 | Petrille, III et al. |

OTHER PUBLICATIONS

G. A. Cary, et al., "The Effect of Suspended Solids and Naturally Occurring Dissolved Organics in Reducing the Acute Toxicities of Cationic Polyelectrolytes to Aquatic Organisms," Environmental Toxicology and Chemistry, vol. 6, pp. 469–474, 1987.

* cited by examiner

Primary Examiner—Betsey Morrison Hoey
(74) Attorney, Agent, or Firm—Madan, Mossman & Sriram, P.C.

(57) ABSTRACT

A method for reducing the toxicity of onium compounds, such as ammonium compounds and phosphonium compounds, by the addition of an anionic polymer is described. Suitable anionic polymers include, but are not necessarily limited to, polycarboxylic acids, polysulfonic acids, polyphosphoric acids, polyphosphonic acids, and mixtures thereof.

16 Claims, 1 Drawing Sheet

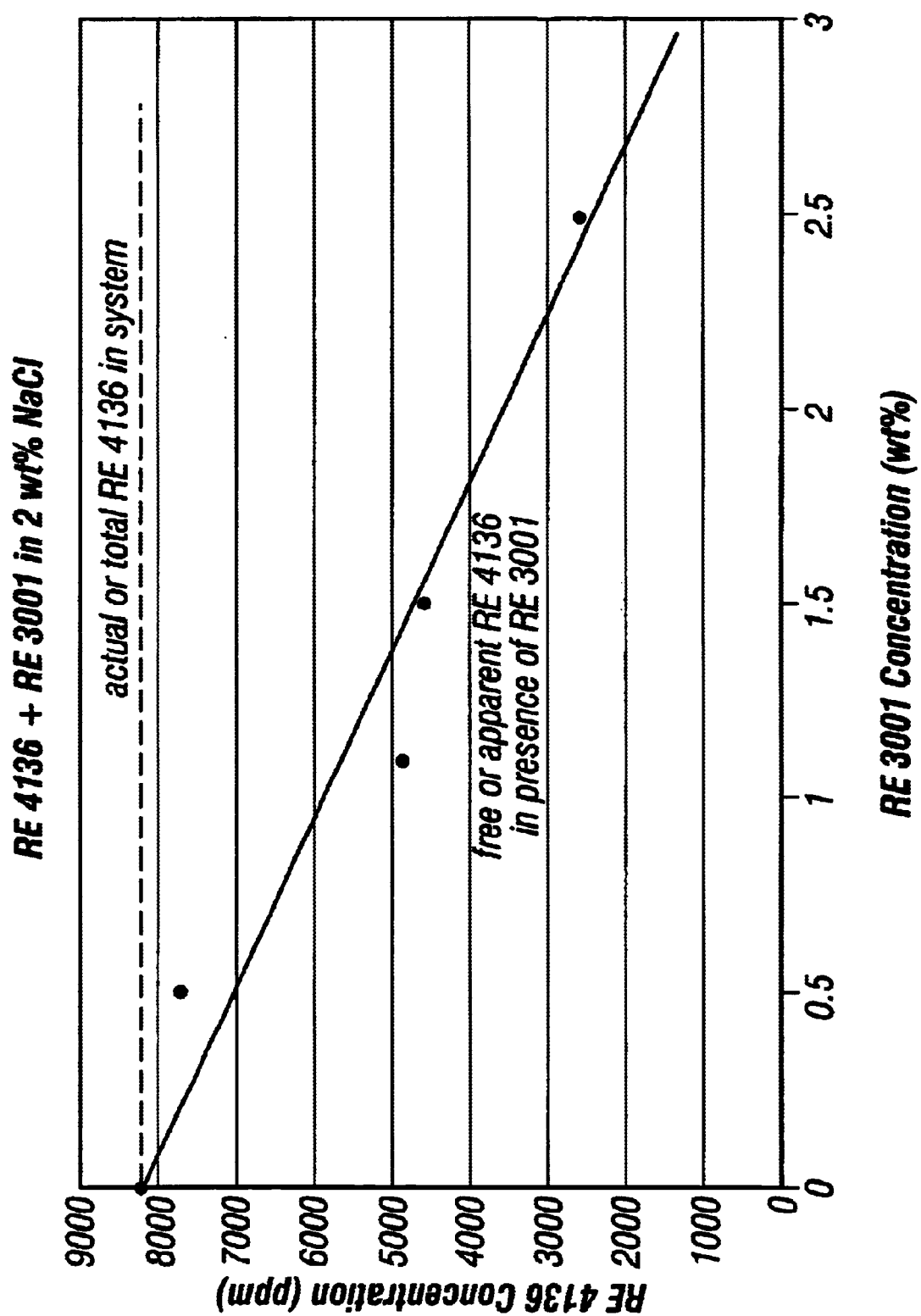

DETOXIFICATION OF QUATERNARY ONIUM COMPOUNDS WITH POLYCARBOXYLATE-CONTAINING COMPOUND

FIELD OF THE INVENTION

The invention relates to methods and compositions for detoxifying aqueous solutions of quaternary onium compounds, and, in one aspect, more particularly relates to methods and compositions for detoxifying aqueous solutions of quaternary onium compounds where the onium compounds remain in the aqueous solution.

BACKGROUND OF THE INVENTION

It is well known that quaternary onium compounds, particularly quaternary ammonium compounds such as quaternary ammonium salts, have found widespread use in a number of applications including, but not necessarily limited to, disinfectants, cleanser and sterilizers, cosmetics (deodorants, dandruff removers, emulsion stabilizers), fungicides, mildew preventatives, antistatic additives, biocides, gas hydrate inhibitors, to increase the affinity of dyes for photographic film, to improve dispersibility in the coatings of pigment particles, to increase adhesion of road dressings and paints, etc. Because quaternary onium compounds function as biocides whether or not this is their originally intended purpose, the residual quaternary onium compounds when discharged into waste water streams after use will interfere in the biological treatment processes by inhibiting the growth of biomass. Additionally, in situations such as discharging used water directly into the environment, such as into seawater, the discharge of water containing quaternary onium compounds may be restricted due to regulations pertaining to the toxicity of such water to marine organisms.

U.S. Pat. No. 4,204,954 concerns the detoxification of residues of quaternary ammonium salt biocides in water using neutralizing amounts of anionic monomers.

There remains a need for new compositions for detoxifying aqueous solutions containing quaternary onium compounds prior to discharge or wastewater treatment with biomass.

SUMMARY OF THE INVENTION

Accordingly, it is an object of the present invention to provide compositions of matter that will reduce the toxicity of aqueous solutions containing quaternary onium compounds.

It is another object of the present invention to provide a method for reducing the toxicity of aqueous solutions containing quaternary onium compounds that can be readily implemented.

It is yet another object of the invention to provide methods and compositions for detoxifying aqueous solutions containing quaternary onium compounds that do not form solids and do not foul conduits and processes downstream of the area where the effective anionic polymers are added.

In carrying out these and other objects of the invention, there is provided, in one form, a method of reducing the toxicity of at least one onium compound in an aqueous solution that involves adding thereto an amount of a polymer selected from the group consisting of nonionic polymers, copolymers and terpolymers; anionic polymers, copolymers, and terpolymers and mixtures thereof, sufficient to reduce the toxicity of the onium compound, where the treated onium compound remains in the aqueous solution.

BRIEF DESCRIPTION OF THE FIGURE

The FIGURE is a graph of the free or apparent RE 4136 onium gas hydrate inhibitor as a function of RE 3001 anionic polymer in a 2 wt % NaCl system.

DETAILED DESCRIPTION OF THE INVENTION

It has been discovered that quaternary onium compounds and the anionic polymers additives of this invention interact or form complexes that reduces the toxicity of the aqueous solution where the quaternary onium compounds are present. The polymer is an anionic or nonionic polymer, copolymer or terpolymer and mixtures thereof, where the preferred polymer is an anionic polymer, copolymer, or terpolymer. The invention relates to methods and compositions for inhibiting, reducing, retarding, mitigating, controlling and minimizing the toxicity of aqueous solutions or otherwise pure water containing quaternary onium compounds. While it may be possible for the methods and compositions of this invention to completely remove, eliminate, eradicate and/or abolish any toxic effects of the quaternary onium compounds in the aqueous solutions or water, it will be appreciated that any reduction, retardation, mitigation, control, and minimization of any toxic effect of the solutions or water using the compositions and methods of this invention is considered a successful accomplishment or achievement of the intended goals and purposes of the invention.

It will further be appreciated that the term "aqueous solutions" refer to any aqueous solution and includes, but is not limited to, solutions where the only other compound besides the quaternary onium compound is pure water. "Aqueous solutions" include, but are not necessarily limited to water-in-oil emulsions, oil-in-water emulsions, and other combinations of hydrocarbons and water, and including mixtures where gas may be present.

The methods and compositions of this invention are not necessarily limited to the particular nature of the aqueous solutions or water treated, but may be applied to any aqueous solutions or water containing quaternary onium compounds, including but not necessarily limited to, aqueous solutions obtained from oil and gas production, for example those treated with quaternary onium compounds to inhibit gas hydrates from forming, aqueous solutions containing quaternary onium compounds as biocides, aqueous solutions containing quaternary onium compounds used as fungicides, aqueous solutions containing quaternary onium compounds used as disinfectants, cleansers and sterilizers and the like, etc.

The method of the present invention involves contacting a suitable aqueous solution containing at least one quaternary onium compound with an effective amount of an anionic polymer to reduce the toxicity of the aqueous solution, where the aqueous solution containing at least one quaternary onium compound under the same conditions exhibits some toxic effects to at least one species.

The contacting may be achieved by a number ways, including mixing, blending with mechanical mixing equipment or devices, stationary mixing setup or equipment, magnetic mixing or other suitable methods, other equipment and means known to one skilled in the art and combinations thereof to provide adequate contact and/or dispersion of the composition in the mixture. The contacting can be made in-line or offline or both. The contacting may be accomplished simply by injecting the anionic polymer into the aqueous solution. There are no temperature or pressure conditions or restrictions upon the contacting.

Suitable onium compounds for use in the composition for the present invention are defined to have a general structure of the following formula having a cation with a center atom X and an anion $Y^-$:

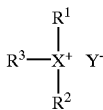

A wherein $R^1$ and $R^2$ each are independently selected from normal or branched alkyls containing a chain of at least 4 carbon atoms, with or without one or more substituents, or one or more heteroatoms;

$R^3$ is an organic moiety containing a chain of at least 4 carbon atoms, with or without one or more substituents, or one or more heteroatoms;

X is S, N—$R^4$ or P—$R^4$;

$R^4$, if present, is selected from H or an alkyl, aryl, alkylaryl, alkenylaryl or alkenyl group, preferably those having from about 1 to about 20 carbon atoms, with or without one or more substituents, or one or more heteroatoms; and $Y^-$ is selected from the group consisting of hydroxide ion ($OH^-$, halide ions such as $Br^-$ and $Cl^-$, carboxylate ions, such as benzoate ($C_6H_5COO^-$), sulfate ion ($SO_4^{=}$), organic sulfonate ions, such as 4-toluene sulfonate and $CH_3SO_3^{31}$, and the like and mixtures thereof.

Ammonium and phosphonium compounds of the above formula may also be bound through $R^4$ to become pendant groups of a number of oxygen-containing polymers. Suitable oxygen-containing polymers include, but are not limited to polyacrylic acid, polymethacrylic acid, copolymers of acrylic and methacrylic acids, and polymers or copolymers of poly-N-vinyl-2-pyrrolidone.

Alkyl ammonium and alkyl phosphonium compounds are preferred onium compounds for the composition of the present invention when $R^4$ is H or any alkyl or alkenyl group. In these preferred onium compounds, $R^3$ can be optionally selected from the group consisting of —($CH_2CHR^5$—O—$)_n$H and —$CH_2CH_2NH$—$)_m$H, wherein $R^5$ is H or methyl; n is an integer from about 5 to about 50; and m is an integer from 1 to about 5.

Examples of preferred cation moiety for the onium compounds include, but are not limited to, tetrapentylammonium, tripentylbutylammonium, triisopentylbutylammonium, tripentyidecylammonium, triisopentylammonium, tributyloctadecylammonium, tetrabutylphosphonium, tributyl(9-octadecenyl) phosphonium ions and mixtures thereof.

In accordance with formula A, examples of onium compounds include, but are not limited to, tributyidecylammonium, tributylundecylammonium, tributyidodecylammonium, tributyltridecylammonium, tributyltetradecylammonium, tributylpentadecylammonium, tributylhexadecylammonium, tributylhetpadecylammonium, tributyloctadecydecylammonium, tributylnonadecylammonium, tripentyidecylammonium, tripentylundecylammonium, tripentyldodecylammonium, tripentyltridecylammonium, tripentytetradecylammonium, tripentylpentadecylammonium, tripentylhexadecylammonium, tripentylheptadecylammonium, tripentyloctadecylammonium, tripentylnonadecylammonium, propyldibutyldecylammonium, propyldibutylundecylammonium, propyidibutyldodecylammonium, propyldibutyltridecylammonium, propyldibutyltetradecylammonium, propyldibutylpentadecylammonium, propyldibutylhexadecylammonium, propyldibutylheptadecylammonium, propyldibutyloctadecylammonium, propyldibutylnonadecylammonium, allyldibutyldecylammonium, allyldibutylundecylammonium, allyidibutyidodecylammonium, allyldibutyltridecylammonium, allyldibutyltetradecylammonium, allyldibutylpentadecylammonium, allyldibutyhexadecylammonium, allyldibutylheptadecylammonium, allyldibutyloctadecylammonium, allyidibutylnonadecylammonium, methallyldibutyldecylammonium, methallyidibutylundecylammonium, methallyldibutyldodecylammonium, methallyidibutyltridecylammonium, methallyidibutyltetradecylammonium, methallyldibutylpentadecylammonium, methallyidibutylhexadecylammonium, methallyldibutylheptadecylammonium, methallyldibutyloctadecylammonium, methallyldibutylnonadecylammonium, dibutyldidecylammonium, dibutyldiundecylammonium, dibutyididodecylammonium, dibutyiditridecylammonium, dibutylditetradecylammonium, dibutyidipentadecylammonium, dibutyldihexadecylammonium, dibutyldiheptadecylammonium, dibutyidioctadecylammonium and dibutyldinonadecylammonium salts, and mixtures thereof.

Additional preferred "onium" compounds include the phosphonium compounds corresponding to above ammonium compounds. These "onium" cornpounds include, but are not limited to tributyldecylphosphonium, tributylundecylphosphonium, tributyldodecylphosphonium, tributyltridecylphosphonium, tributyltetradecylphosphonium, tributylpentadecylphosphonium, tributylhexadecylphosphonium, tributylheptadecylphosphonium, tributyloctaydecylphosphonium, tributylnonadecylphosphonium, tripentyidecylphosphonium, tripentylundecylphosphonium, tripentyldodecylphosphonium, tripentyltridecylphosphonium, tripentyltetradecylphosphonium, tripentylpentadecylphosphonium, tripentylhexadecylphosphonium, tripentylheptadecylphosphonium, tripentyloctadecylphosphonium, tripentyinonadecylphosphonium, propyldibutyldecylphosphonium, propyldibutylundecylphosphonium, propyldibutyidodecylphosphonium, propyldibutyltridecylphosphonium,
propyldibutyltetradecylphosphonium,
propyldibutylpentadecylphosphonium,
propyldibutylhexadecylphosphonium,
propyldibutylheptadecylphosphonium,
propyldibutyloctadecylphosphonium,
propyidibutyinonadecylphosphonium,
allyidibutyldecylphosphonium,
allyldibutylundecylphosphonium,
allyidibutyldodecylphosphonium,
allyldibutyltridecylphosphonium,
allyldibutyltetradecylphosphonium,
allyidibutylpentadecylphosphonium,
allyidibutyhexadecylphosphonium,
allyldibutylheptadecylphosphonium,
allyldibutyloctadecylphosphonium,
allyldibutylnonadecylphosphonium,
methallyldibutyldecylphosphonium,
methallyidibutylundecylphosphonium,
methallyldibutyidodecylphosphonium,
methallyldibutyltridecylphosphonium,
methallyldibutyltetradecylphosphonium,
methallyldibutylpentadecylphosphonium,
methallyldibutylhexadecyphosphonium,
methallyldibutylheptadecylphosphonium,
methallyldibutyloctadecylphosphonium,
methallyidibutylnonadecylphosphonium,
dibutyldidecylphosphonium,
dibutyldiundecylphosphonium,
dibutyldidodecylphosphonium,
dibutyiditridecylphosphonium,
dibutylditetradecylphosphonium,
dibutyldipentadecylphosphonium,
dibutyldihexadecylphosphonium,
dibutyidiheptadecylphosphonium, dibutyldioctadecylphosphonium and dibutyidinonadecylphosphonium salts and mixtures thereof.

Also preferred for the present invention are onium compounds wherein zero to five of the $CH_2$ groups in the longest chains of the onium compound are replaced with one or more of the following groups $CHCH_3$, $CHOH$, $O$, $C=O$. Thus the onium compound may contain methyl groups, hydroxyl groups, ether groups or linkages, ester groups or linkages, and/or ketone groups. One advantage of such materials is that oxygen atoms in the chains, when present, can improve the biodegradability of the onium compounds. Also, two adjacent $CH_2$ groups in the longest chains of the onium compound may be replaced with a $CH=CH$ group such that the onium compound may contain one or more carbon to carbon double bonds. The "onium" compounds are named after the parent hydrocarbon and the replacement group(s) in the longest chain are then stated. Thus $$CH_3CH_2CH_2CH_2CH_2CH_2CH_2OCH_2CH_2CH_2CH_2N(CH_2CH_2CH_2CH_3)_3$$

is referred to as tributyldodecylammonium where C5 is replaced with O.

Examples of onium compounds where $CH_2$ groups in the longest chains are replaced with $CHCH_3$, $CHOH$, $O$, $C=O$, or $CH=CH$ groups include but are not limited to:
tributyldecylammonium, tributylundecylammonium,
tributyldodecylammonium, tributyltridecylammonium,
tributyltetradecylammonium,
tributylpentadecylammonium,
tributylhexadecylammonium,
tributylhetpadecylammonium,
tributyloctadecydecylammonium,
tributylnonadecylammonium,
tripentyldecylammonium, tripentylundecylammonium,
tripentyldodecylammonium,
tripentyltridecylammonium,
tripentytetradecylammonium,
tripentylpentadecylammonium,
tripentylhexadecylammonium,
tripentylheptadecylammonium,
tripentyloctadecylammonium,
tripentylnonadecylammonium,
propyidibutyidecylammonium,
propyidibutylundecylammonium,
propyidibutyldodecylammonium,
propyldibutyltridecylammonium,
propyldibutyltetradecylammonium,
propyidibutylpentadecylammonium,
propyidibutylhexadecylammonium,
propyldibutylheptadecylammonium,
propyidibutyloctadecylammonium,
propyldibutyinonadecylammonium,
allyldibutyidecylammonium,
allyldibutylundecylammonium,
allyidibutyidodecylammonium, allyidibutyl-tridecylammonium, allyldibutyltetradecylammonium,
allyldibutylpentadecylammonium,
allyidibutylhexadecylammonium,
allyldibutylheptadecylammonium,
allyldibutyloctadecylammonium,
allyldibutyinonadecylammonium,
methallyidibutyidecylammonium,
methallyldibutylundecylammonium,
methallyldibutyldodecylammonium,
methallyldibutyltridecylammonium,
methallyldibutyltetradecylammonium,
methallyidibutylpentadecylammonium,
methallyidibutylhexadecylammonium,
methallyidibutylheptadecylammonium,
methallyldibutyloctadecylammonium,
methallyldibutyinonadecylammonium,
dibutyididecylammonium,
dibutyidiundecylammonium,
dibutyldidodecylammonium,
dibutylditridecylammonium,
dibutyiditetradecylammonium,
dibutyldipentadecylammonium,
dibutyidihexadecylammonium,
dibutyldiheptadecylammonium, dibutyldioctadecylammonium and dibutyidinonadecylammonium salts where C2 is replaced with CHOH and C4 is replaced with O;
tributyidecylammonium, tributylundecylammonium,
tributyldodecylammonium, tributyltridecylammonium,
tributyltetradecylammonium,
tributylpentadecylammonium,
tributylhexadecylammonium,
tributylhetpadecylammonium,
tributyloctadecydecylammonium,
tributyinonadecylammonium,
tripentyidecylammonium, tripentylundecylammonium,
tripentyidodecylammonium,
tripentyltridecylammonium,
tripentytetradecylammonium,
tripentylpentadecylammonium,
tripentylhexadecylammonium,
tripentylheptadecylammonium,
tripentyloctadecylammonium,
tripentylnonadecylammonium,
propyidibutyldecylammonium, propyldibutylundecylammonium,
propyldibutyldodecylammonium,
propyldibutyltridecylammonium,
propyidibutyltetradecylammonium,
propyldibutylpentadecylammonium,
propyldibutylhexadecylammonium,
propyidibutylheptadecylammonium,
propyldibutyloctadecylammonium,
propyldibutyinonadecylammonium,
allyldibutyldecylammonium,
allyldibutylundecylammonium,
allyidibutyldodecylammonium,
allyldibutyltridecylammonium,
allyldibutyltetradecylammonium,
allyidibutylpentadecylammonium,
allyidibutylhexadecylammonium,
allyldibutylheptadecylammonium,
allyidibutyloctadecylammonium,
allyidibutyinonadecylammonium,
methallyidibutyldecylammonium,
methallyldibutylundecylammonium,
methallyldibutyidodecylammonium,
methallyidibutyltridecylammonium,
methallyidibutyltetradecylammonium,
methallyldibutylpentadecylammonium,
methallyidibutylhexadecylammonium,
methallyidibutylheptadecylammonium,
methallyidibutyloctadecylammonium,
methallyidibutyinonadecylammonium,
dibutyidecylammonium,
dibutyidiundecylammonium,
dibutyldidodecylammonium,
dibutyiditridecylammonium,
dibutylditetradecylammonium,
dibutyidipentadecylammonium,
dibutyldihexadecylammonium,
dibutyidiheptadecylammonium, dibutyidioctadecylammonium and dibutyldinonadecylammonium salts where C2 is replaced with CHCH₃, C3 is replaced with O and C4 is replaced with C=O;
tributyldecylammonium, tributylundecylammonium, tributyidodecylammonium, tributyltridecylammonium,
tributyltetradecylammonium,
tributylpentadecylammonium,
tributylhexadecylammonium,
tributylhetpadecylammonium,
tributyloctadecydecylammonium,
tributylnonadecylammonium,
tripentyldecylammonium, tripentylundecylammonium,
tripentyidodecylammonium,
tripentyltridecylammonium,
tripentytetradecylammonium,
tripentylpentadecylammonium,
tripentylhexadecylammonium,
tripentylheptadecylammonium,
tripentyloctadecylammonium,
tripentyinonadecylammonium,
propyldibutyidecylammonium,
propyldibutylundecylammonium,
propyldibutyldodecylammonium,
propyldibutyltridecylammonium,
propyldibutyltetradecylammonium,
propyldibutylpentadecylammonium,
propyldibutylhexadecylammonium,
propyldibutylheptadecylammonium,
propyidibutyloctadecylammonium,
propyidibutyinonadecylammonium,
allyldibutyldecylammonium,
allyldibutylundecylammonium,
allyidibutyldodecylammonium, allyidibutyl-tridecylammonium, allyldibutyltetradecylammonium,
allyldibutylpentadecylammonium,
allyidibutylhexadecylammonium,
allyidibutylheptadecylammonium,
allyIdibutyloctadecylammonium,
allyldibutylnonadecylammonium,
methallyldibutyldecylammonium,
methallyldibutylundecylammonium,
methallyidibutyidodecylammonium,
methallyidibutyltridecylammonium,
methallyidibutyltetradecylammonium,
nmethallyidibutylpentadecylammonium,
methallyidibutylhexadecylammonium,
methallyidibutylheptadecylammonium,
methallyidibutyloctadecylammonium,
methallyldibutylnonadecylammonium,
dibutyididecylammonium,
dibutyidiundecylammonium,
dibutyldidodecylammonium,
dibutylditridecylammonium,
dibutyiditetradecylammonium,
dibutyidipentadecylammonium,
dibutyldihexadecylammonium,
dibutyldiheptadecylammonium, dibutyldioctadecylammonium and dibutyidinonadecylammonium salts where C3 is replaced with O and C4 is replaced with C=O;
tributyldecylammonium, tributylundecylammonium, tributyidodecylammonium, tributyltridecylammonium,
tributyltetradecylammonium,
tributylpentadecylammonium,
tributylhexadecylammonium,
tributylhetpadecylammonium,
tributyloctadecydecylammonium,
tributylnonadecylammonium,
tripentyidecylammonium, tripentylundecylammonium,
tripentyidodecylammonium,
tripentyltridecylammonium,
tripentytetradecylammonium,
tripentylpentadecylammonium,
tripentylhexadecylammonium,
tripentylheptadecylammonium,
tripentyloctadecylammonium,
tripentylnonadecylammonium,
propyidibutyidecylammonium,
propyidibutylundecylammonium,
propyldibutyidodecylarmmonium,
propyldibutyltridecylammonium,
propyldibutyltetradecylammonium,
propyidibutylpentadecylammonium,
propyidibutylhexadecylammonium,
propydibutylheptadecylammonium,
propydibutyloctadecylammonium,
propyldibutyinonadecylammonium,
allyldibutyidecylammonium,
allyidibutylundecylammonium,
allyldibutyldodecylammonium,
allyldibutyltridecylammonium,
allyldibutyltetradecylammonium,
allyidibutylpentadecylammonium,
allyidibutyhexadecylammonium,
allyldibutylheptadecylammonium,
allyidibutyloctadecylammonium,
allyidibutylnonadecylammonium, methallyldibutyldecylammonium,
methallyldibutylundecylammonium,
methallyldibutyldodecylammonium,
methallyldibutyltridecylammonium,
methallyldibutyltetradecylammonium,
methallyldibutylpentadecylammonium,
methallyldibutylhexadecylammonium,
methallyldibutylheptadecylammonium,
methallyldibutyloctadecylammonium,
methallyldibutylnonadecylammonium,
dibutyldidecylammonium,
dibutyldiundecylammonium,
dibutyldidodecylammonium,
dibutylditridecylammonium,
dibutylditetradecylammonium,
dibutyldipentadecylammonium,
dibutyldihexadecylammonium,
dibutyldiheptadecylammonium, dibutyldioctadecylammonium and dibutyldinonadecylammonium salts where C3 is replaced with O;

tributyldecylammonium, tributylundecylammonium, tributyldodecylammonium, tributyltridecylammonium,
tributyltetradecylammonium,
tributylpentadecylammonium,
tributylhexadecylammonium,
tributylheptadecylammonium,
tributyloctadecydecylammonium,
tributylnonadecylammonium,
tripentyldecylammonium, tripentylundecylammonium,
tripentyldodecylammonium,
tripentyltridecylammonium,
tripentytetradecylammonium,
tripentylpentadecylammonium,
tripentylhexadecylammonium,
tripentylheptadecylammonium,
tripentyloctadecylammonium,
tripentylnonadecylammonium,
propyldibutyldecylammonium,
propyldibutylundecylammonium,
propyldibutyldodecylammonium,
propyldibutyltridecylammonium,
propyldibutyltetradecylammonium,
propyldibutylpentadecylammonium,
propyldibutylhexadecylammonium,
propyldibutylheptadecylammonium,
propyldibutyloctadecylammonium,
propyldibutylnonadecylammonium,
allyldibutyldecylammonium,
allyldibutylundecylammonium,
allyldibutyldodecylammonium,
allyldibutyltridecylammonium,
allyldibutyltetradecylammonium,
allyldibutylpentadecylammonium,
allyldibutylhexadecylammonium,
allyldibutylheptadecylammonium,
allyldibutyloctadecylammonium,
allyldibutylnonadecylammonium,
methallyldibutyldecylammonium,
methallyldibutylundecylammonium,
methallyldibutyldodecylammonium,
methallyldibutyltridecylammonium,
methallyldibutyltetradecylammonium,
methallyldibutylpentadecylammonium,
methallyldibutylhexadecylammonium,
methallyldibutylheptadecylammonium,
methallyldibutyloctadecylammonium,
methallyldibutylnonadecylammonium,
dibutyldidecylammonium,
dibutyldiundecylammonium,
dibutyldidodecylammonium, dibutylditridecylammonium, dibutylditetradecylammonium,
dibutyldipentadecylammonium,
dibutyldihexadecylammonium,
dibutyldiheptadecylammonium, dibutyldioctadecylammonium and dibutyldinonadecylammonium salts where C9 and C10 are replaced with CH=CH.

Also suitable are phosphonium compounds corresponding to these ammonium compounds. Finally, mixtures of such onium compounds are suitable or in many cases preferred for use with the present invention. A number of other examples have been disclosed and described in U.S. Pat. Nos. 5,460,728 and 5,648,575 and such compounds can also be used with the present invention.

Anionic polymers suitable for reducing the toxicity of the onium compounds include, but are not necessarily limited to, polycarboxylic acids, polysulfonic acids, polyphosphoric acids, polyphosphonic acids, salts thereof and mixtures thereof. Particularly preferred anionic polymers are polycarboxylic acids and the salts thereof, or copolymers of carboxylic acid with other monomers such as phosphoric acid, sulfonic acid, phosphonic acid and salts thereof and mixtures thereof. In one non-limiting embodiment of the invention, the $M_n$ of the polymer (nonionic or anionic) ranges from about 200 to 500,000 and the $M_w$ of the polymer ranges from about 400 to about 1,000,000; preferably the $M_n$ of the polymer ranges from about 300 to 20,000 and the $M_w$ ranges from about 600 to about 40,000.

Examples of particular anionic polymers include, but are not necessarily limited to, polymaleic acid, polyacrylic acid, polymethacrylic acid, polyvinylsulfonic acid, polyallylsulfonic acid, polyvinylphosphonic acid, polyallylphosphonic acid, and copolymers or terpolymers, e.g. maleic/acrylic, acrylic/vinylsulfonic, maleic/allylsulfonic, acrylic/vinylphosphonic, acrylic/vinylsulfonic/vinylphosphonic, and mixtures thereof. The pH of the anionic polymer is preferably adjusted such that the mixture of the onium compound and the anionic polymer do not form solids and do not foul the oil and/or gas producing system, or other system of the environment where the onium compounds are present. In a non-limiting example, usually the polycarboxylic acid is at low pH, often below 3. The pH is adjusted with an aqueous base, such as sodium or potassium hydroxide to the desired pH and then added to the system containing the onium compound. In one non-limiting embodiment, the pH is adjusted to between about 3 and 11, preferably between about 5 and about 9.

The reaction products of the onium compound with the anionic polymers of this invention should be soluble in the aqueous phase. The anionic polymers may be added to the onium compound either downhole or on the surface (or top side for offshore hydrocarbon recovery) to effect detoxification. No solids (such as clays or lignosulfonates) are employed in the inventive method, which simplifies handling and mixing.

It will be appreciated that it is difficult to accurately predict in advance the necessary amounts of anionic polymer necessary to effectively reduce the toxicity of the onium compounds. Indeed, in one non-limiting embodiment of the invention, any reduction in toxicity will be understood as successful practice of the invention. There are a number of complex, interrelated factors that will affect the desired proportion of anionic polymer used in any given situation including, but not necessarily limited to, the nature and proportion of the onium compound, the nature and proportion of the hydrocarbon in the system being treated, the temperature of the system being treated, the particular anionic polymer being considered, etc. Nevertheless, to give some indication of the expected effective proportions of the anionic polymer, in one non-limiting embodiment, the proportion of anionic polymer may range from about 10:1 to about 1:10 in weight ratio with the onium compound, preferably in weight ratio of from about 3:1 to about 1:3.

The invention will be further illustrated with reference to actual examples that are not intended to limit the invention, but rather to more completely describe it.

COMPARATIVE EXAMPLES 1–8

Definitions

RE 4136 is a quaternary ammonium compound available from Baker Petrolite. RE 4154 is a quaternary ammonium compound available from Baker Petrolite. % in the rows before Examples 1 and 5 refer to the total amount of RE 4154 or RE 4136 present.

Dilution Water: Synthetic seawater (Hawaiian MarineMix), initial salinity 28 ppt, initial pH=8.1, temperature 20±2° C.

Test Organisms: Mysid shrimp, Mysidopsis bahia, obtained from Cosper Environmental, four days old at the start of the test. Ten animals per vessel for a total of 10 animals per concentration.

Observations: In the Site 1 blank study, dissolved oxygen depletions were observed at 48 hours at 1, 10, and 25% (Example 5). In the Site 1 crude oil+RE 4154 study (Example 6), a 48 hour dissolved oxygen depletion was seen at 1%, but not at 10 or 25%. It is conjectured that organic materials present in the Site 1 crude oil A-1 condensate are biodegradable, causing a drop in oxygen levels at 48 hours. In the Site 1+RE 4154 test (Example 6), the inhibitor may be biocidal at higher concentrations. Free oil was observed at 10 and 25% in the Site 2+RE 4136 study (Examples 4 and 8).

Results: The 48 hour $LC_{50}$ for Site 2+RE 4136 (Example 8) appears to be approximately 0.01% with the No Observed Adverse Effect Concentration (NOAEC) less than 0.01%. The 48 hour $LC_{50}$ for Site 1+RE 4154 (Example 6) appears to be approximately 0.01% with the NOAEC less than 0.01%. The results are shown in Table I.

TABLE I

Comparative Examples 1–8

| Ex. Comp. | Control | 0.01% | 0.1% | 1.0% | 10.0% | 25.0% |
|---|---|---|---|---|---|---|
| 24 Hour Percent Survival | | | | | | |
| 1 Site 1 Blank | 90 | 100 | 100 | 100 | 100 | 100 |
| 2 Site 1 + RE 4154 | 100 | 70 | 0 | 0 | 0 | 0 |
| 3 Site 2 Blank | 100 | 100 | 100 | 100 | 100 | 70 |
| 4 Site 2 + RE 4136 | 100 | 100 | 0 | 0 | 0 | 0 |
| 48 Hour Percent Survival | | | | | | |
| 5 Site 1 Blank | 90 | 100 | 100 | 100 | 100 | 60 |
| 6 Site 1 + RE 4154 | 100 | 10 | 0 | 0 | 0 | 0 |
| 7 Site 2 Blank | 100 | 100 | 100 | 100 | 100 | 70 |
| 8 Site 2 + RE 4136 | 100 | 60 | 0 | 0 | 0 | 0 |

EXAMPLES 9–14

The results of Comparative Examples 9–11 and 13 and Inventive Examples 12 and 14 are presented in Table II below. Note that mortality instead of survival is reported.

The purpose of Comparative Examples 9 and 10 using Site 3 crude oil was to see if laboratory tests predict the reduction in toxicity seen during the field test, and indeed the tests show no mortality.

The purpose of the Examples using the crude oils from offshore Sites 1 and 2 is to see if RE 3001 was effective at neutralizing the toxicity of the RE 4136 and RE 4154 gas hydrate inhibitors. RE 3001 is a water soluble polymer available from Baker Petrolite. As can be seen, RE 3001 effectively reduced mortality to zero when the combined proportion of the gas hydrate inhibitor and RE 3001 was 0.1%.

TABLE II

Comparative and Inventive Examples 9–14
48 Hour Percent Mysid Shrimp Survival

| Ex. | Comp. | 0.01% | 0.1% | 1.0% |
|---|---|---|---|---|
| Comp. 9 | Site 3 Blank | 100 | 100 | 100 |
| Comp. 10 | Site 3 + RE 4136 | 100 | 100 | 100 |
| Comp. 11 | Site 2 + RE 4136 | — | 0 | — |
| Inv. 12 | Site 2 + RE 3001 + RE 4136 | — | 100 | — |
| Comp. 13 | Site 1 + RE 3001 | — | 90 | — |
| Inv. 14 | Site 1 + RE 3001 + RE 4154 | — | 100 | — |

The FIGURE shows a graph of the free or apparent RE 4136 in a 2 wt % NaCl system as a function of RE 3001 wt % concentration, where the actual or total RE 4136 in the system is about 8250 ppm. It may be seen that the free or apparent RE 4136 in the system steadily decreases with increasing RE 3001 concentration indicating the continued effectiveness of the RE 3001 neutralization.

Many modifications may be made in the present invention without departing from the spirit and scope thereof that are defined only by the appended claims. For example, certain components per se, or combinations of onium compounds and anionic polymers thereof other than those specifically set out herein may be found by one of routine skill in the art to be particularly advantageous. Additionally, certain proportions of anionic polymers may give particular efficacy.

We claim:

1. A method of reducing the toxicity of at least one onium compound in an aqueous solution comprising adding thereto an amount of a polymer selected from the group consisting of nonionic polymers, copolymers and terpolymers; anionic polymers, copolymers, and terpolymers and mixtures thereof, sufficient to reduce the toxicity of the onium compound, where the treated onium compound remains in the aqueous solution.

2. The method of claim 1 where the anionic polymer is selected from the group consisting of a homopolymer, copolymer and terpolymer formed from monomers selected from the group consisting of carboxylic acids, sulfonic acids, phosphoric acids, phosphonic acids, salts thereof, and mixtures thereof.

3. The method of claim 1 wherein the onium compound has a structure of the following formula having a cation and an anion $Y^-$:

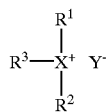

A wherein
$R^1$ and $R^2$ each are independently selected from normal or branched alkyls containing a chain of at least 4 carbon atoms, with or without one or more substituents, or one or more heteroatoms;
$R^3$ is an organic moiety containing a chain of at least 4 carbon atoms, with or without one or more substituents, or one or more heteroatoms;
X is S, N—$R^4$ or P—$R^4$;
$R^4$, if present, is selected from H or an alkyl, aryl, alkylaryl, alkenylaryl or alkenyl group, preferably those having from about 1 to about 20 carbon atoms, with or without one or more substituents, or one or more heteroatoms; and
$Y^-$ is selected from the group consisting of hydroxide ion (OH$^-$), halide ions, carboxylate ions, sulfate ion, organic sulfonate ions, and mixtures thereof.

4. The method of claim 1 wherein the effective amount of the anionic polymer ranges from about 10:1 to about 1:10 in weight ratio with the onium compound.

5. The method of claim 1 wherein the anionic polymer is selected from the group consisting of a homopolymer, copolymer, and terpolymer of a carboxylic acid monomer and a monomer selected from the group consisting of sulfonic acids, phosphoric acids, phosphonic acids, and mixtures thereof.

6. A method of reducing the toxicity of at least one onium compound in an aqueous solution comprising adding thereto an amount of an anionic polymer sufficient to reduce the toxicity of the onium compound,
where the treated onium compound remains in the aqueous solution;
where the anionic polymer is selected from the group consisting of a homopolymer, copolymer and terpolymer formed from monomers selected from the group consisting of carboxylic acids, sulfonic acids, phosphoric acids, phosphonic acids, salts thereof, and mixtures thereof; and
where the onium compound has a structure of the following formula having a cation and an anion $Y^-$:

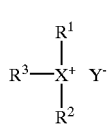

A wherein
$R^1$ and $R^2$ each are independently selected from normal or branched alkyls containing a chain of at least 4 carbon atoms, with or without one or more substituents, or one or more heteroatoms;
$R^3$ is an organic moiety containing a chain of at least 4 carbon atoms, with or without one or more substituents, or one or more heteroatoms;
X is S, N—$R^4$ or P—$R^4$
$R^4$, if present, is selected from H or an alkyl, aryl, alkylaryl, alkenylaryl or alkenyl group, preferably those having from about 1 to about 20 carbon atoms, with or without one or more substituents, or one or more heteroatoms; and
$Y^-$ is selected from the group consisting of hydroxide ion (OH$^-$), halide ions, carboxylate ions, sulfate ion, organic sulfonate ions, and mixtures thereof.

7. The method of claim 6 wherein the effective amount of the anionic polymer ranges from about 10:1 to about 1:10 in weight ratio with the onium compound.

8. The method of claim 6 wherein the anionic polymer is selected from the group consisting of a homopolymer, copolymer, and terpolymer of a carboxylic acid monomer and a monomer selected from the group consisting of sulfonic acids, phosphoric acids, phosphonic acids, and mixtures thereof.

9. An aqueous solution comprising:
at least one onium compound; and
water;

a polymer selected from the group consisting of nonionic polymers, copolymers and terpolymers; anionic polymers, copolymers, and terpolymers and mixtures thereof, where the amount of polymer is sufficient to reduce the toxicity of the aqueous solution as compared with an identical aqueous solution having an absence of the polymer.

10. The aqueous solution of claim 9 where the anionic polymer is selected from the group consisting of a homopolymer, copolymer and terpolymer formed from monomers selected from the group consisting of carboxylic acids, sulfonic acids, phosphoric acids, phosphonic acids, salts thereof, and mixtures thereof.

11. The aqueous solution of claim 9 wherein the onium compound has a structure of the following formula having a cation and an anion Y$^-$:

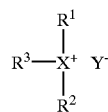

A wherein

R$^1$ and R$^2$ each are independently selected from normal or branched alkyls containing a chain of at least 4 carbon atoms, with or without one or more substituents, or one or more heteroatoms;

R$^3$ is an organic moiety containing a chain of at least 4 carbon atoms, with or without one or more substituents, or one or more heteroatoms;

X is S, N—R$^4$ or P—R$^4$;

R$^4$, if present, is selected from H or an alkyl, aryl, alkylaryl, alkenylaryl or alkenyl group, preferably those having from about 1 to about 20 carbon atoms, with or without one or more substituents, or one or more heteroatoms; and Y$^-$ is selected from the group consisting of hydroxide ion (OH$^-$), halide ions, carboxylate ions, sulfate ion, organic sulfonate ions, and mixtures thereof.

12. The aqueous solution of claim 9 wherein the effective amount of the anionic polymer ranges from about 10:1 to about 1:10 in weight ratio with the onium compound.

13. The aqueous solution of claim 9 wherein the anionic polymer is selected from the group consisting of a homopolymer, copolymer, and terpolymer of a carboxylic acid monomer and a monomer selected from the group consisting of sulfonic acids, phosphoric acids, phosphonic acids, and mixtures thereof.

14. An aqueous solution comprising:

water;

at least one onium compound having a structure of the following formula having a cation and an anion Y$^-$:

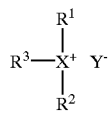

A wherein

R$^1$ and R$^2$ each are independently selected from normal or branched alkyls containing a chain of at least 4 carbon atoms, with or without one or more substituents, or one or more heteroatoms;

R$^3$ is an organic moiety containing a chain of at least 4 carbon atoms, with or without one or more substituents, or one or more heteroatoms;

X is S, N—R$^4$ or P—R$^4$;

R$^4$, if present, is selected from H or an alkyl, aryl, alkylaryl, alkenylaryl or alkenyl group, preferably those having from about 1 to about 20 carbon atoms, with or without one or more substituents, or one or more heteroatoms; and Y$^-$ is selected from the group consisting of hydroxide ion (OH$^-$), halide ions, carboxylate ions, sulfate ion, organic sulfonate ions, and mixtures thereof; and an anionic polymer is selected from the group consisting of a homopolymer, copolymer and terpolymer formed from monomers selected from the group consisting of carboxylic acids, sulfonic acids, phosphoric acids, phosphonic acids, salts thereof, and mixtures thereof, where the amount of anionic polymer is sufficient to reduce the toxicity of the aqueous solution as compared with an identical aqueous solution having an absence of the anionic polymer.

15. The aqueous solution of claim 14 wherein the effective amount of the anionic polymer ranges from about 10:1 to about 1:10 in weight ratio with the onium compound.

16. The aqueous solution of claim 14 wherein the anionic polymer is selected from the group consisting of a homopolymer, copolymer, and terpolymer of a carboxylic acid monomer and a monomer selected from the group consisting of sulfonic acids, phosphoric acids, phosphonic acids, and mixtures thereof.

* * * * *